United States Patent [19]
Lenney et al.

[11] Patent Number: 5,649,560
[45] Date of Patent: Jul. 22, 1997

US005649560A

[54] COMBINED MEASURING AND INJECTING FLOW CELL

[75] Inventors: John Robert Lenney, Grass Valley; John Scott Lenney, Redono Beach; Lance Irvin Fitzsimmons; Harold Matthew Van Gordon, both of Costa Mesa, all of Calif.

[73] Assignee: Acu-Trol, Grass Valley, Calif.

[21] Appl. No.: 555,126

[22] Filed: Nov. 8, 1995

[51] Int. Cl.$^6$ ............................................. G05D 11/08
[52] U.S. Cl. ............................ 137/93; 137/559; 137/576; 137/592; 210/92; 210/94; 210/96.1
[58] Field of Search ............................ 137/93, 559, 574, 137/576, 592; 210/92, 94, 96.1, 199; 422/82.03

[56] References Cited

U.S. PATENT DOCUMENTS

| | | | |
|---|---|---|---|
| 2,289,610 | 7/1942 | Wallace | 137/93 X |
| 4,550,011 | 10/1985 | McCollum. | |

*Primary Examiner*—Gerald A. Michalsky
*Attorney, Agent, or Firm*—Russell J. Egan

[57] ABSTRACT

A combined measuring and injecting flow cell has a single housing defining a pair of chambers connected by a small passage. The first or sensing chamber has an inlet valve and at least one monitoring member extending therein. The second or injection chamber has an outlet valve and at least one injector extending therein. Preferably at least one wall of the cell is transparent to allow visually monitoring the conditions within.

20 Claims, 1 Drawing Sheet

5,649,560

1

COMBINED MEASURING AND INJECTING FLOW CELL

BACKGROUND OF THE INVENTION

1. The Field of the Invention

The present invention concerns a method and apparatus to monitor the addition of chemicals to a fluid system by determining flow/no-flow condition, controlling fluid flow, and controlling the condition and operation of chemical sensors and, in particular, to a method and apparatus for controlling the chemical balance in swimming pools and the like.

2. The Prior Art

The automatic control of the feeding of chemicals to, for example, swimming pools or industrial baths, requires accurate measuring of the chemical conditions within the pool or bath in order to inject the proper amount of the corrective chemicals. Chemical balances in a flowing liquid system can become inaccurate (out-of-tolerance) and are generally difficult to diagnose when problems arise. The problems can be generally classified in two classes, namely problems in measuring and problems in adding correcting chemicals. The most common measuring problems include: the sensors are dirty; the fluid flow rate past the sensors is too low or too high; the sensors are in contact with air rather than liquid; corrective chemicals that were fed downstream of the sensors are interfering with the sensor readings; and fluid turbulence around the sensors. The most common problems related to the process of adding chemicals into a fluid system are: the injectors may have become clogged thereby limiting the flow of corrective chemicals through the injector; the chemicals don't flow when the device feeding chemicals to the injector is activated; and the addition of chemicals when there is no fluid flow in the system. There is a possible safety problem associated with feeding chemicals in a no-flow condition in that the adjusting chemicals may come in contact with each other in their undiluted condition and cause an unwanted chemical reaction. In order to prevent such a problem from arising, a flow sensing device should be included in the system.

Preferably a control device should have a fail safe way to determine the flow/no-flow condition within the flow cell circuit. A conventional pressure switch located anywhere in the circuit will not provide a satisfactory indication of flow conditions since it will be defeated by a valve being accidentally closed or blocked by debris (a common occurrence). In this condition the system could have pressure but no-flow. Many known flow switches are subject to malfunction due to clogging from foreign matter and they are not subject to visual inspection while in operation. Flow switches must be installed in a proper location in the system to provide protection against accidental chemical injection.

Diagnosing chemical injecting problems is generally a time consuming process and, in many cases, causes the operator to needlessly come into contact with the chemical additives, often in their full strength condition. An operator will typically start by disconnecting one or more of the chemical injectors and, since they are filled with full strength or diluted chemicals, will often get these chemicals on him. Incorrect reassembly may lead to leaking.

The prior art partially addresses some of the problems associated with the sensors. For example U.S. Pat. No. 4,550,011 discloses a device that holds two sensors under a transparent cover which allows one to see if the sensors are dirty. This patent teaches injecting acid directly into the flow cell for cleaning only, not for water balancing, and fails to inject the sanitizer directly into the flow cell. However, this patent doesn't address the problems associated with the chemical injectors, limiting and adjusting the flow rate through the device, providing protection from feeding in a no-flow situation, ease of installation or even limiting the number of components required for installation in a bypass line.

The present invention concerns a method and apparatus that solves all the above listed problems and has additional features of making it substantially impossible for air to become trapped at the sensor tips, provides protection against adding chemicals in a no-flow situation, and substantially reduces or eliminates injector clogging.

SUMMARY OF THE INVENTION

The present invention is a combined measuring and injecting flow cell which is connected into a flow line of a fluid system, such as a water circulation line in a swimming pool filtering system. The fluid, i.e. water, enters the cell through an inlet valve and standpipe to substantially fill a first or sensing chamber, containing at least one sensor, before flowing through an opening and filling an adjacent second or injecting chamber containing at least one injector. Fluid flow through the standpipe activates flow detecting means. When the entire cell is filled, the water flows out through an outlet valve in the second or injecting and returns to the system. The standpipe at the inlet reduces fluid turbulence around the sensors and assures that they will be substantially completely surrounded by water. The positioning of the opening connecting the chambers assures that treated water, namely the water in the second or injecting chamber, which water has had corrective chemicals added to it, will not flow back into the first or sensing chamber thereby creating false readings of the condition of the water in the system.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

Figure 1:
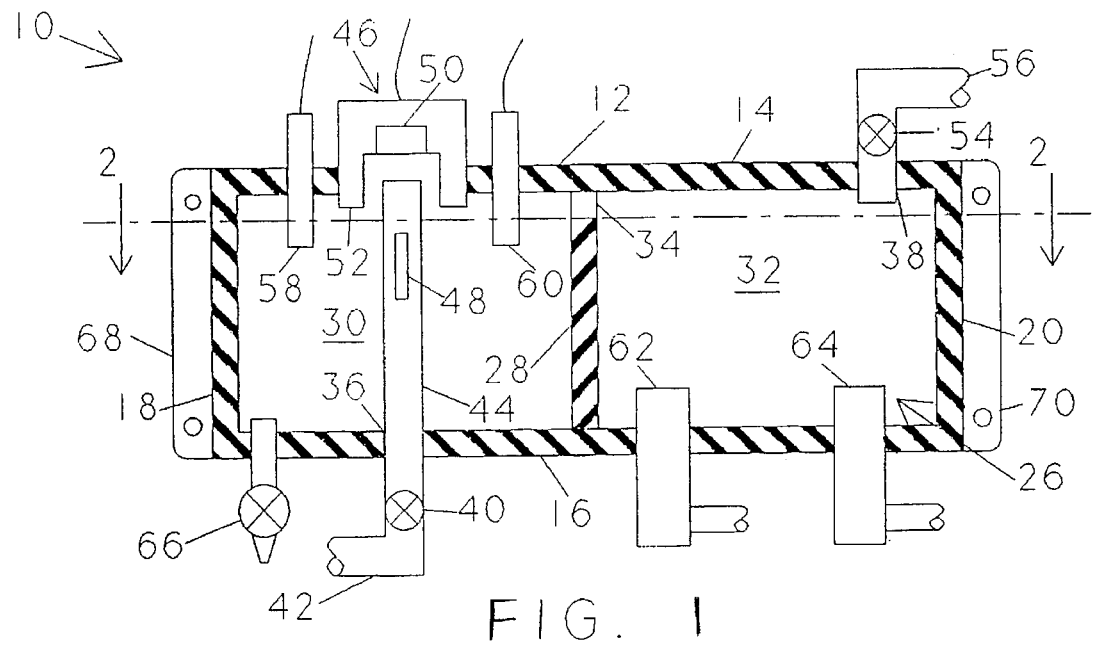
FIG. 1 is a vertical section through the subject cell taken along line 1—1 of FIG. 2.
Figure 2:
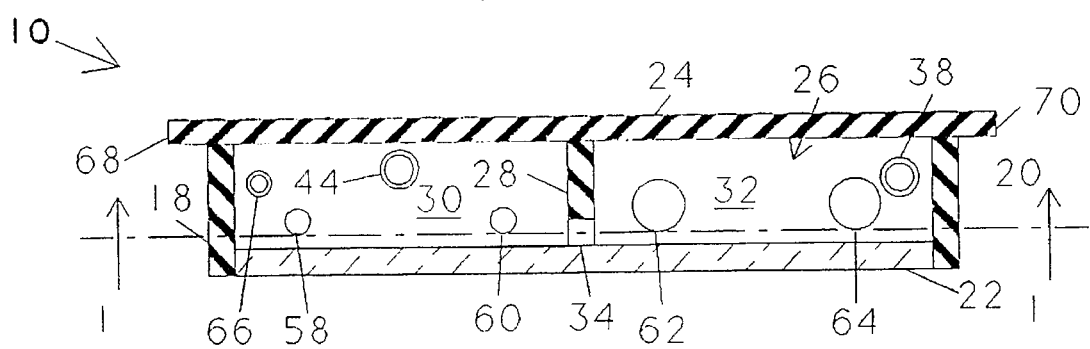
FIG. 2 is a longitudinal section through the subject cell taken along line 2—2 of FIG. 1.
Figure 3:
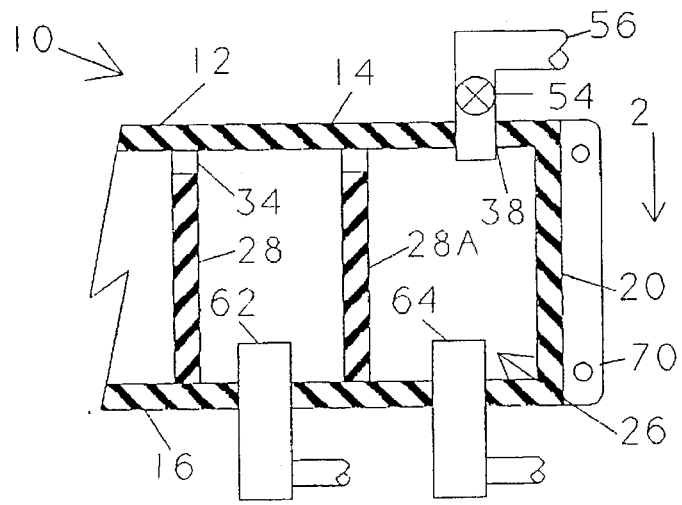
FIG. 3 is a partial vertical section, similar to FIG. 1, showing an alternate embodiment of the present invention.

Turning now to the figures, the present invention 10 has a two chambered, rectangular, closed housing 12 formed by top and bottom walls 14, 16, end walls 18, 20, and front and back walls 22, 24, defining a fluid tight cavity 26 with a fixed partitioning wall 28 therein forming first or sensing and second or injecting chambers 30, 32, respectively. An orifice or port 34 is formed near the upper end of the wall 28 providing communication between the first and second chambers 30, 32. A water inlet port 36 is formed in the bottom of first or sensing chamber 30 and a similar outlet port 38 is formed in the top of the second or injecting chamber 32. An inlet control valve 40 connects the inlet port 36 to a system line 42. A standpipe 44 is connected to the inlet port 36 and extends to near the top of first or sensing chamber 30 directly below and aligned with flow sensing means 46. The flow sensing means 46 is here depicted by a float 48 in the standpipe and switch means 50 in housing 52 fixed to the top wall 14. An outlet control valve 54 connects the outlet port 38 to system line 56. First and second sensing means 58, 60 are fixedly mounted depending from the top wall 14 of housing 12 into first or sensing chamber 30. The sensing means 58, 60 are connected to known monitoring/ control means (not shown). In a somewhat similar fashion, first and second injector means 62, 64 are mounted projecting upwardly from the bottom wall 16 of the housing 12 into second or injecting chamber 32. Each injector means 62, 64 is connected to a respective known chemical source (not shown) through a known dispensing means (also not shown) such as a pump. A test valve 66 is connected to first or sensing chamber 30 to allow tapping off a portion of the fluid flowing through the chamber for chemical analysis. Front wall 22 is preferably made of transparent material allowing viewing of the chambers 30, 32. The back wall 24 is preferably provided with a pair of lateral mounting flanges 68, 70. An alternate embodiment with two injection chambers is shown in FIG. 3. Wall 28A separates the injection chambers.

The present invention would be connected, by its inlet and outlet valves 40, 54, into a fluid flow line 42, 56 of a system, such as a water circulation line in a swimming pool filtering system, which is to be monitored and controlled. The fluid, i.e. water, would flow into the subject cell through valve 40 and standpipe 44, pushing float 48 up against flow switch 50 to indicate there is fluid flowing in the system. The fluid substantially fills first or sensing chamber 30, before flowing through opening 34 and filling second or injecting chamber 32. When the entire cell is filled, the water flows out through valve 54 and returns to the system. The standpipe 44 assures that the sensors 58 and 60 will be substantially completely immersed in water at all times. The housing 52 of the flow detection means 46 is preferably profiled to direct the flow of the incoming water down and away from the sensors 58, 60 thereby minimizing turbulence in the vicinity of the sensor tips. The positioning of opening 34 high in partition wall 28 assures that treated water, namely the water in the second or injecting chamber 32, which water may have had corrective chemicals added to it, will not flow back into the first or sensing chamber 30 thereby causing the sensors to generate false readings of the condition of the water in the system.

Flow through the chamber is controlled by fully opening inlet valve 40 and adjusting outlet valve 54 to the desired flow setting. If outlet valve 54 was left closed, the flow sensing means 46 would indicate a no-flow condition and no chemicals would be injected in this situation. A pressure switch might, in this situation, indicate the presence of pressure and assume there was fluid flow when actually a no-flow condition exists.

Only two sensors and two injectors have been show for the sake of simplifying the drawings. It is to be noted that the present invention is not limited to two sensors and two injectors but that these numbers can be changed as required.

The housing of the present invention is preferably formed as a unitary device for mounting a plurality of sensors and injectors. This device will greatly simplify the installation of sensors and injectors into a fluid flow system by substantially reducing the required number of fittings. The transparent front wall or cover allows visual inspection of the injectors and sensors and other interior areas. The chemicals can be observed as they are being injected. This information is very important when diagnosing where a chemical feeding problem lies.

The standpipe 44 does not allow air to be trapped at the sensor tips under normal and no-flow operation. If a sensor's tip is in air, then that sensor will most likely not read properly. Also the sensors may be damaged or degraded if exposed to air for extended periods of time. With this design, air can not be trapped in the flow cell under normal and no-flow conditions.

In a no-flow situation (no water flow through the cell) it is, of course, possible to still feed the chemicals into the system (if the information from the flow switch was not used). In that case the chemicals would mix in second or injection chamber 32 and gradually flow back through hole 34 into first or sensing chamber 30 causing the sensors 58, 60 to detect the change in chemical balance and the monitor/ controller (not shown) would then prevent the further addition of chemicals. In order for this to work, it is very important to ensure that the sensors are always in water so the chemical values can be determined.

The valves 40 and 54 are used to adjust the flow rate and also for stopping the flow when replacing or cleaning the metering gauge, probes and injectors.

Flow sensing means 46 is used by the control means (not shown) to determine flow/no-flow within the flow cell so that chemicals will not be injected in a no-flow condition. The flow sensing means has here been shown as a simple float 48 that would react to flow of fluid through the standpipe and cause actuation of switch means 50. This includes many possibilities, for example, the float 48 could physically actuate a micro switch through contact or the float could carry magnetic means which would actuate a micro switch when the float reaches a certain limit.

So long as the flow is in the proper direction, the sensors will always read the values of the liquid entering the flow cell, even if chemicals are being added in second chamber 32.

The test valve 66 can be used to tap off a measured amount of the liquid in order to measure or test the liquid the sensors are measuring. It can also be used to drain the cell, should the sensors or injectors require attention or if the cell is to be replaced.

The location of hole 34 is higher than the active ends of the sensors 58, 60 to ensure the sensors are always in the liquid. If air enters the system (from either a leak in the housing 12 or from the flow line 42) the air may rise in the cell and temporarily lower the level of the liquid, but the air will not cause the sensors ends to be exposed as it will pass out of outlet port 38 to flow line 56.

The device is preferably made of thick plastics material that can be easily drilled and tapped in the field allowing one to add additional devices, such as pressure switch and/or temperature sensor. The embodiment illustrated is shown having only two chambers. Clearly multiple chambers, each connected in series by one or more ports 34, could be provided with each chamber separately receiving a chemical additive.

Placement of an acid injector close to a sanitizer injector has the added benefit of providing a cleaning action that will help to reduce the clogging of the injectors.

The present invention may be subject to many changes, which will be apparent to those skilled in the art, without departing from the spirit of essential characteristics of the present invention. The above described embodiment should therefor be considered in all respects as illustrative and not restrictive of the scope of the invention as defined by the appended claims.

We claim:

1. A sample flow cell comprising:
    a housing defining a fluid tight cavity with wall means dividing said cavity into a sensing chamber and at least one injecting chamber, an opening in said wall means providing communication between said sensing and injecting chambers;

fluid inlet means connected to said sensing chamber;

fluid outlet means connected to each said at least one injecting chamber;

at least one sensing means depending into said sensing chamber; and at least one injector means extending into said injecting chamber.

2. A sample flow cell according to claim 1 wherein said fluid inlet means comprises:

inlet valve means, and fluid level control means preventing draining of said sensing chamber under normal and no-flow conditions.

3. A sample flow cell according to claim 2 wherein said fluid level control means comprises a stand-pipe connected to said inlet valve means.

4. A sample flow cell according to claim 1 further comprising:

flow sensing means whereby a flow/no-flow condition is determined.

5. A sample flow cell according to claim 1 further comprising:

test valve means connected into said sensing chamber whereby liquid in said sensing chamber can be tapped off.

6. A sample flow cell according to claim 1 wherein said fluid outlet means comprises:

outlet valve means is connected to at least one injecting chamber.

7. A sample flow cell according to claim 1 further comprising:

at least one wall of said housing being formed from transparent material whereby the interior of said cell can be visually monitored.

8. A sample flow cell according to claim 1 wherein said at least one injecting chamber comprises:

a plurality of injecting chambers, each connected separately a respective injector means to receive a single chemical additive, each said injecting chamber being interconnected for common flow to said fluid outlet means.

9. A sample flow cell according to claim 1 further comprising:

means assuring any air entering said cell will not collect in such fashion as to allow sensing ends of said sensing means to be exposed to air rather than liquid.

10. A sample flow cell according to claim 1 further comprising:

means for minimizing turbulence within said cell and for directing any turbulence away from said sensing means.

11. A sample flow cell according to claim 1 wherein upon detection of a no flow condition and/or detecting a rapid increase in chemical concentration, further feeding of chemicals is prohibited.

12. In a closed circuit liquid circulating system, a flow sampling cell for determining and controlling the chemical make up of the circulating liquid, said cell comprising:

a housing defining a liquid tight cavity with wall means dividing said cavity into a sensing chamber and at least one injecting chamber, an opening in said wall means providing communication between said sensing and injecting chambers;

fluid inlet means connected to said sensing chamber;

fluid outlet means connected to each said at least one injecting chamber;

at least one sensing means depending into said sensing chamber; and at least one injector means extending into each said at least one injecting chamber.

13. A sample flow cell according to claim 12 wherein said fluid inlet means comprises:

inlet valve means; and stand-pipe means connected to said inlet valve means providing fluid level control means preventing draining of said sensing chamber under normal and no-flow conditions.

14. A sample flow cell according to claim 12 further comprising:

flow sensing means whereby a flow/no-flow condition within said cell is determined.

15. A sample flow cell according to claim 12 further comprising:

test valve means connected into said sensing chamber whereby liquid in said sensing chamber can be tapped off.

16. A sample flow cell according to claim 12 wherein said fluid outlet means comprises:

outlet valve means connected to each said at least one injecting chamber.

17. A sample flow cell according to claim 12 further comprising:

at least one wall of said housing being formed from transparent material whereby the interior of said cell can be visually monitored.

18. A sample flow cell according to claim 12 wherein said at least one injecting chamber comprises:

a plurality of injecting chambers, each separately connected to a respective injector means to receive a single chemical additive, said injecting chambers being interconnected for common flow to said fluid outlet means.

19. A sample flow cell according to claim 12 further comprising:

means assuring any air entering said cell will not collect in such fashion as to allow sensing ends of said sensing means to be exposed to air rather than liquid.

20. A sample flow cell according to claim 12 further comprising:

means for minimizing turbulence within said cell and for directing any turbulence away from said sensing means.

* * * * *